E. H. AMET.
METHOD OF AND MEANS FOR LOCALIZING SOUND REPRODUCTION.
APPLICATION FILED JULY 3, 1911.
1,124,580.
Patented Jan. 12, 1915.
2 SHEETS—SHEET 2.
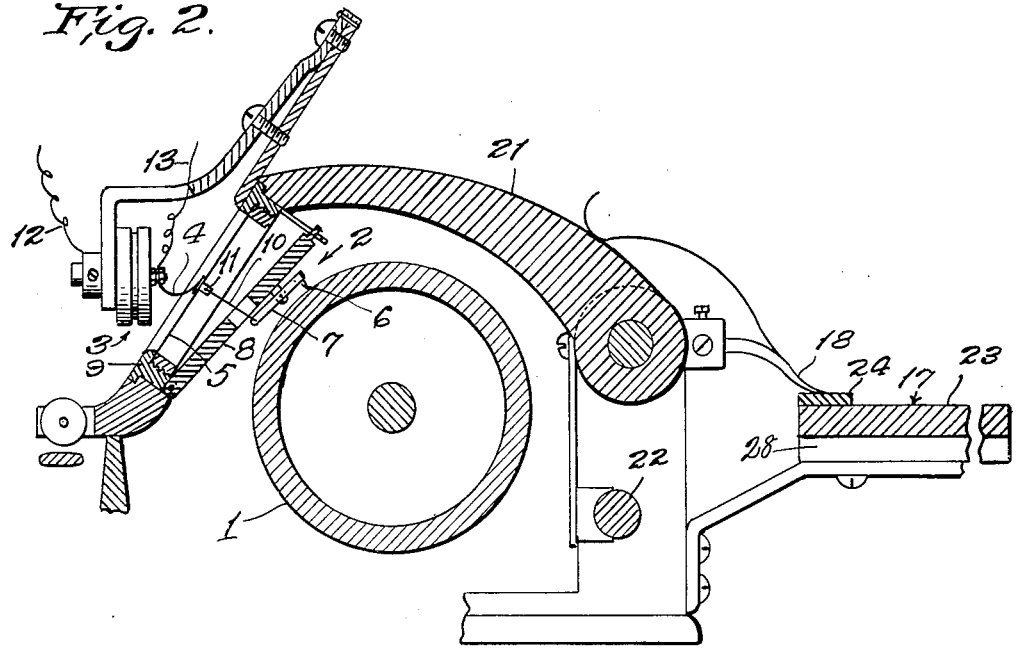
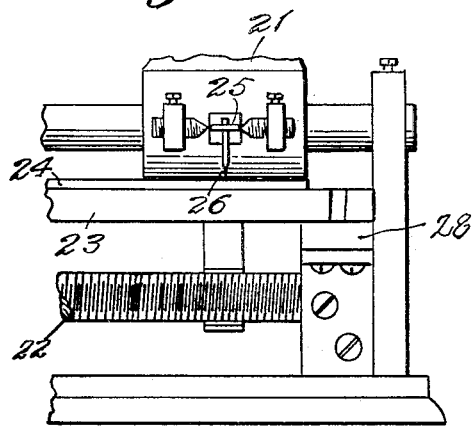
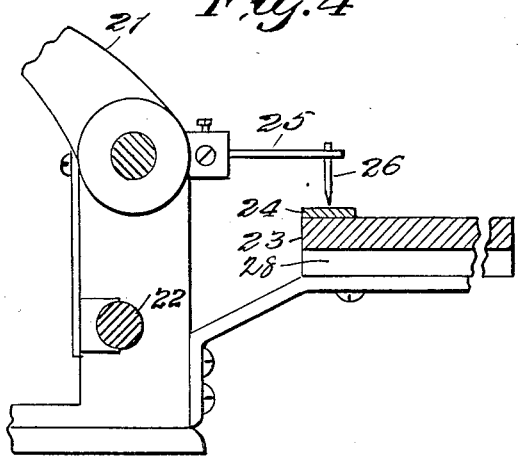

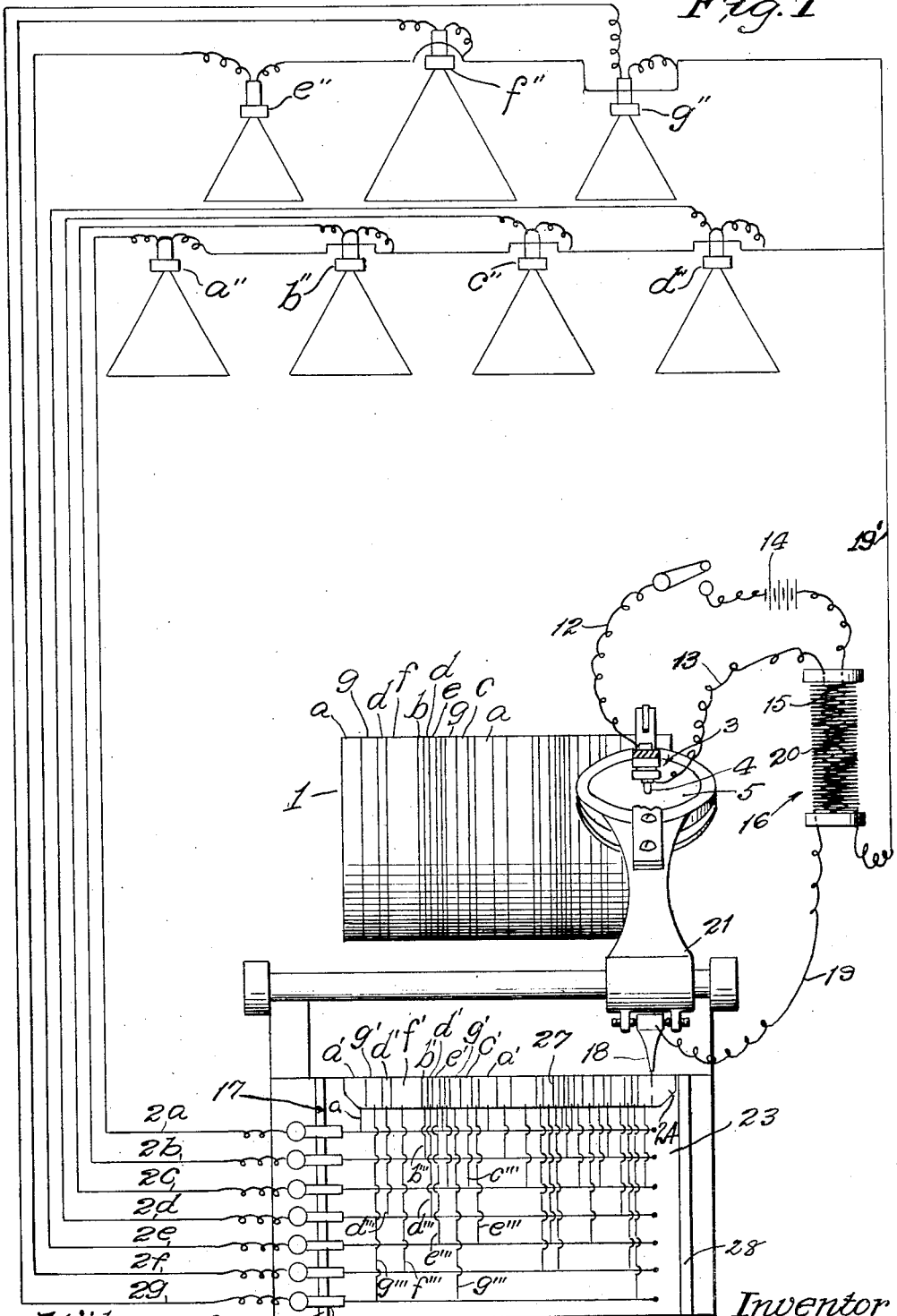

UNITED STATES PATENT OFFICE.

EDWARD H. AMET, OF REDONDO BEACH, CALIFORNIA.

METHOD OF AND MEANS FOR LOCALIZING SOUND REPRODUCTION.

1,124,580.  Specification of Letters Patent. Patented Jan. 12, 1915.

Application filed July 3, 1911. Serial No. 636,740.

*To all whom it may concern:*

Be it known that I, EDWARD H. AMET, a citizen of the United States, residing at Redondo Beach, in the county of Los Angeles and State of California, have invented a new and useful Method of and Means for Localizing Sound Reproduction, of which the following is a specification.

An object of this invention is to reproduce different parts of a sound record at different predetermined places, in such manner that the sounds accompanying an operatic, theatrical or other action may be appropriately located relative to their respective parts in the action. That is to say, by this invention the audible actions may be localized to correspond with localized visual actions, so that if both actions are simultaneously reproduced they may truly represent the original production.

I regard the invention as pioneer and believe it to be wholly new to divide a sound reproduction into parts that are variously located.

This invention includes the art or method of localizing sound reproduction, which consists in reproducing individual characteristic sound record parts in succession from a sound record device containing such sound record parts successively aranged; electrically distributing said individual characteristic parts to predetermined differently located stations; and enouncing said parts at the stations respectively to which they are distributed.

In carrying out this invention various sound record devices, as phonograph cylinders, gramophone disks or sound record wires or tapes may be employed and the invention may be explained by reference to one of such devices.

The invention may be carried out in various ways and by various means.

Objects of this invention are to create means whereby the phonograph or talking machine may be used for the purpose of supplying to moving picture characters the vocal or audible parts, also to provide means whereby the sounds produced by a talking machine record may be carried to a distance, as from the back of a hall or theater where the moving picture machine is generally located to the front of the hall or theater where the screen for receiving the picture is located; to produce means whereby the sounds from one talking machine record may be reproduced from a number of different locations so that the sound may seem to come from the character supposed to utter them; to produce means whereby the sounds from a phonograph or talking machine may be subdivided into such portions as are desired (for example, a question and answer) and means for transferring said sounds from the phonograph or talking machine to two or more points or locations as predetermined. For instance, two dummies made up to represent the speakers may seemingly converse, one asking questions and the other answering, the sound reproduced from the single record not coming from one fixed point as from one phonograph horn or from one telephone receiver, but on the contrary issuing directly from the locality of the seeming speaker.

The invention comprises an electrical telephone transmitter so connected that the greatest volume of sound may be reproduced from a telephone receiver and still retain the clearness of articulation and tone color of the record.

It also includes means for switching either automatically or manually from one telephone receiver to another; the current from said transmitter making it possible to arrange the switching of portions of a conglomeration of recorded parts to as many telephone receivers as may be required to produce the desired effect.

The means employed may comprise:

First, a sound reproducing machine of desirable construction such as are found on the open market; (I shall show herein a phonograph as it lends itself to the simpler construction of the completed device, and it is obvious that a disk machine may be operated after a similar manner);

Second, a telephone transmitter resistance in connection with the diaphragm of a talking machine. I have demonstrated that through the connection shown in the accompanying drawings a greater volume and purer tones can be obtained than with any solid connection or by connecting an ordinary telephone transmitter to the phonograph reproducer by means of a tube;

Third, a simple switching device driven by the mechanism of the sound reproducing machine and comprising a moving spring switch arm carried by the reproducer arm or the feed screw of the sound reproducing machine, and commutator sections carried a suitable back of insulation and forming contact points for the switch arm which in turn connects the commutator sections respectively, to the receiver circuits.

Along one side of the insulation backing are commutator sections made of proper width to allow the switch arm to continue in contact with said sections during the period in which the portion of the record contained on a like width of the sound record disk, or cylinder is passing under the reproducing stylus of the reproducer. During such period the enouncer, as a telephone receiver in the circuit so closed will reproduce the sound from the record device.

The invention may be understood by reference to the accompanying drawings which illustrate apparatus constructed in accordance with this invention and employing a cylindrical record device.

Figure 1 is a diagrammatic representation of the apparatus. Fig. 2 is a detail partly in sectional elevation illustrating the connection between the sound translator and the telephone transmitter. Fig. 3 is a fragmental detail partly in section, showing the uncut commutator strip on its backing, and the marker in position. Fig. 4 is a fragmental elevation from the left of Fig. 3.

The sound record device as the cylinder 1 may be naturally divided into successive individual characteristic parts as indicated at $a, b, c, d, e, f, g$ that respectively contain the sound record parts that may have successively emanated from various characters at definite localities at the time the record was impressed on the record device. These parts on the record may not in appearance be distinguished from each other as to the location of the sounds to be reproduced from them but at the time of their production from the initial action or at a subsequent time, the positions of the actions may be noted by the observer.

The record device and record translator are in movable relation to each other. In this instance the record translator 2 is movable relative to the rotating record device 1.

By reason of its minute character the record is not visible in the drawings.

The carbon telephone transmitter 3 is of the usual type and the bent resilient contact 4 slidingly connects the diaphragm 5 of the translator with the transmitter 3, which is arranged aslant relative to said diaphragm so that the vibrations are transmitted from the translator to the telephone transmitter in a smooth manner without harsh direct hammering action.

The translator 2 consists of the usual phonograph reproducing stylus 6 and lever 7 carried by the counterpoise 8 pivoted to the diaphragm frame 9; said lever being connected in the usual way through the link 10 and diaphragm connection 11 with the diaphragm 5.

The telephone transmitter 3 is in circuit through the connections 12, 13, with a battery 14 and the primary windings 15 of an induction coil 16.

The commutator 17 is provided with sections that correspond in number to the number of stations at which the record is to be reproduced. In the drawings the commutator sections that correspond to the record parts and reproducing stations are respectively marked with corresponding characters and distinguished by an index. For example, the sections marked $a'$ correspond with the record parts marked $a$; and so on.

Telephone receivers $a'', b'', c'', d'', e'', f''$ and $g''$ are arranged, respectively, at the stations where the various parts of the record are to be reproduced; the receiver $a''$ being where the record part $a$ is to be reproduced, and so on.

All of the commutator sections $a'$ are connected with the telephone receiver $a''$ assigned to the part $a$, and so on; the connection being by suitable leads as $a'''$ and $2^a$ and so on.

The contact point 18 for conducting electrical impulses from the telephone transmitter 3 to the commutator sections is connected with a common return wire 19, 19' in circuit with said telephones and the secondary winding 20 of the induction coil 16. The contact point is carried by the stylus feed arm 21 which is driven by the usual phonograph feed screw 22.

In practice each record device is accompanied by its commutator and the commutators will be detachable so that they may be changed with their records. For this purpose the commutator may be a plate composed of an insulating back 23 on which is cemented or otherwise mounted a thin conducting sheet 24 of brass or other suitable metal to be divided into the sections, the divisions between which are marked by the observer to coincide with the divisions between the sound record parts. Such marking may be done by stationing the undivided insulator backed commutator strip 24 in fixed relation to the record device either in the record-producing machine or in the record-reproducing machine; and a marker 25 which may correspond to the contact point 18 and which moves in ratio with the producing or reproducing stylus, as the case may be, will be quickly tapped with a hammer or other suitable instrument to drive it against the commutator strip at each point in the action where a change in the location of the produced or reproduced sound occurs. This is done while the contact or marker 25 is traveling over the commutator strip and said contact or marker will be provided with a thin knife edge or prick point as at 26 to cut or prick a fine visible mark each time the marker is struck. After the commutator strip has thus been fully marked, it will be sawn asunder by a thin saw at each mark and the saw kerfs will then be filled with shellac, mica, or other thin insulating material indicated at 27; and after this insulating substance has set and the contact faces of the sections made clean so as to make good connection with the contact 18 the sections are appropriately connected with the commutator leads as $a'''$, etc., which are fixed to the insulating backing.

The reproducing machine has a seat 28 for the commutator and contact springs 29, one for each of the telephone receivers are connected by the leads $2^a$, etc., with said receivers respectively, and are in position to contact with the leads assigned to the different sound record parts.

When the record device and its commutator are in the reproducing machine, and said machine is operated to reproduce the record; the translated record parts, as they are transmitted from the telephone transmitter, are switched during the transmission of the record from the station constituted by the record device to the appropriate stations constituted by the telephone receivers. In this way the actions visualized by a motion picture may be accompanied by appropriate sound actions properly located so that the voices of speakers will seem to come from the speakers respectively.

By the means shown a picture of a moving sound-making object may be accompanied in its travel across the screen by its appropriate reproduced sound.

The commutator is shown adjustable endwise in its seat to enable the operator to bring it into register with the record on the sound-record device. The contact springs 29 serve to hold the commutator in set position.

I claim:—

1. The combination with a sound record device, of a record translator in movable relation thereto, a telephone transmitter connected with the translator, a commutator, telephone receivers connected with the commutator sections respectively, a contact point for conducting electrical impulses from the telephone transmitter to the commutator; means for causing relative movement between the record and translator and means to cause relative movement between the commutator and the contact point in ratio with the movement between the record device and translator.

2. In combination with a talking machine having a sound record device; an electrical sound transmitter operated by the talking machine; two or more telephone receivers; electrical circuits for connecting the receivers with the transmitter; and an automatic switching device comprising a segmental commutator and a contact arm in connection with and operated by the sound record device for switching in one or another of the telephone receivers; said switching device controlling the distribution of the current from the electrical transmitter through the circuits respectively as required.

3. A sound transmitter comprising a diaphragm, a carbon electric transmitter arranged aslant relative to the diaphragm and a resilient contact slidingly connecting the diaphragm and the transmitter.

4. A sound transmitter comprising a diaphragm, a carbon electric transmitter arranged aslant relative to the diaphragm and a bent resilient contact slidingly connecting the diaphragm and the transmitter.

5. A sound transmitter comprising a diaphragm, a carbon electric transmitter, and a bent resilient contact slidingly connecting the diaphragm and the electric transmitter.

6. The combination with a sound record device and a stylus and diaphragm connected therewith, of an electrical transmitter and a bent resilient contact slidingly connecting the diaphragm with the transmitter.

In testimony whereof, I have hereunto set my hand at Los Angeles, California, this 27th day of June, 1911.

EDWARD H. AMET.

In presence of—
JAMES R. TOWNSEND,
L. BELLE RICE.